(12) United States Patent
Nordback

(10) Patent No.: US 11,373,626 B2
(45) Date of Patent: Jun. 28, 2022

(54) ORDERING UNCERTAINTY REPRESENTATION USING TRANSPARENCY BLENDING

(71) Applicant: Konica Minolta Business Solutions U.S.A., Inc., San Mateo, CA (US)

(72) Inventor: Kurt Nathan Nordback, Boulder, CO (US)

(73) Assignee: Konica Minolta Business Solutions U.S.A., Inc., San Mateo, CA (US)

( * ) Notice: Subject to any disclaimer, the term of this patent is extended or adjusted under 35 U.S.C. 154(b) by 7 days.

(21) Appl. No.: 16/997,230

(22) Filed: Aug. 19, 2020

(65) Prior Publication Data

US 2022/0059056 A1    Feb. 24, 2022

(51) Int. Cl.
  G09G 5/377   (2006.01)
  G09G 5/38    (2006.01)
  G06V 10/50   (2022.01)

(52) U.S. Cl.
  CPC ............ G09G 5/377 (2013.01); G06V 10/50 (2022.01); G09G 2354/00 (2013.01)

(58) Field of Classification Search
  CPC .... G09G 5/377; G09G 2370/022; G09G 5/38; G09G 3/20; G09G 2340/0464; G09G 2340/12; G06K 9/4642; G06F 3/14; G06F 3/1454; G06F 2203/04804
  See application file for complete search history.

(56) References Cited

U.S. PATENT DOCUMENTS

| | | | |
|---|---|---|---|
| 6,028,583 A | 2/2000 | Hamburg | |
| 6,373,834 B1 | 4/2002 | Lundh et al. | |
| 6,438,702 B1 | 8/2002 | Hodge | |
| 6,466,210 B1 | 10/2002 | Carlsen et al. | |
| 7,446,781 B2 | 11/2008 | O'Donnell et al. | |
| 8,416,812 B2 | 4/2013 | Radulescu | |
| 8,923,346 B2 | 12/2014 | Li et al. | |
| 9,565,227 B1* | 2/2017 | Helter | H04L 67/42 |
| 2020/0005735 A1* | 1/2020 | Kim | G06F 3/0481 |
| 2020/0388248 A1* | 12/2020 | Kimata | G09G 5/38 |

OTHER PUBLICATIONS

Yamashita et al., "A Statistical Method for Time Synchronization of Computer Clocks with Precisely Frequency-Synchronized Oscillators", Proceedings of the 18th International Conference on Distributed Computing Systems, Amsterdam, May 26-29, 1998 (8 pages).

* cited by examiner

Primary Examiner — Jin Cheng Wang
(74) Attorney, Agent, or Firm — Osha Bergman Watanabe & Burton LLP

(57) ABSTRACT

A method for processing images in an information sharing and collaboration environment includes: receiving a plurality of graphical contents including a first graphical content from a first source and a second graphical content from a second source different from the first source within the information sharing and collaboration environment and overlapping the first and second graphical contents; determining a probability that the first graphical content was created before the second graphical content; rendering, using a transparency blending formula and based on the probability that the first graphical content was created before the second graphical content, an opacity of an overlapped portion of the first and second graphical contents; and displaying, on a display, the overlapped first and second graphical contents.

17 Claims, 4 Drawing Sheets

ORDERING UNCERTAINTY REPRESENTATION USING TRANSPARENCY BLENDING

BACKGROUND

Interactive devices such as a Projection with Interactive Capture (PIC) system allow participants to remotely collaborate with one another while projecting images created by the participants. The projected images are overlapped over one another in the order in which they are received rather than in the order in which they are created. This is generally a result of the clocks of the participants' computing devices not being synchronized and potential lags that occur in the network transfer times. Therefore, the actual order in which the images are created cannot be accurately determined. Regardless, users still wish to have the projected images displayed in the order in which the images were created rather than the order in which the images were received.

SUMMARY

In general, in one aspect, the invention relates to a method for processing images in an information sharing and collaboration environment. The method comprises receiving a plurality of graphical contents including a first graphical content from a first source and a second graphical content from a second source different from the first source within the information sharing and collaboration environment and overlapping the first and second graphical contents; determining a probability that the first graphical content was created before the second graphical content; rendering, using a transparency blending formula and based on the probability that the first graphical content was created before the second graphical content, an opacity of an overlapped portion of the first and second graphical contents; and displaying, on a display, the overlapped first and second graphical contents.

In general, in one aspect, the invention relates to a non-transitory computer readable medium (CRM) storing computer readable program code for displaying an ordering of a plurality of graphical contents embodied therein. The computer readable program code causes a computer to receive a plurality of graphical contents including a first graphical content from a first source and a second graphical content from a second source different from the first source within the information sharing and collaboration environment and overlap the first and second graphical contents, determine a probability that the first graphical content was created before the second graphical content; render, using a transparency blending formula and based on the probability that the first graphical content was created before the second graphical content, an opacity of an overlapped portion of the first and second graphical contents; and display, on a display, the overlapped first and second graphical contents.

In general, in one aspect, the invention relates to a system for displaying an ordering of a plurality of graphical contents. The system comprises a memory; and a processor coupled to the memory. The processor receives a plurality of graphical contents including a first graphical content from a first source and a second graphical content from a second source different from the first source within the information sharing and collaboration environment and overlaps the first and second graphical contents; determines a probability that the first graphical content was created before the second graphical content; renders, using a transparency blending formula and based on the probability that the first graphical content was created before the second graphical content, an opacity of an overlapped portion of the first and second graphical contents; and displays, on a display, the overlapped first and second graphical contents.

Other aspects of the invention will be apparent from the following description and the appended claims.

DETAILED DESCRIPTION

Figure 1:
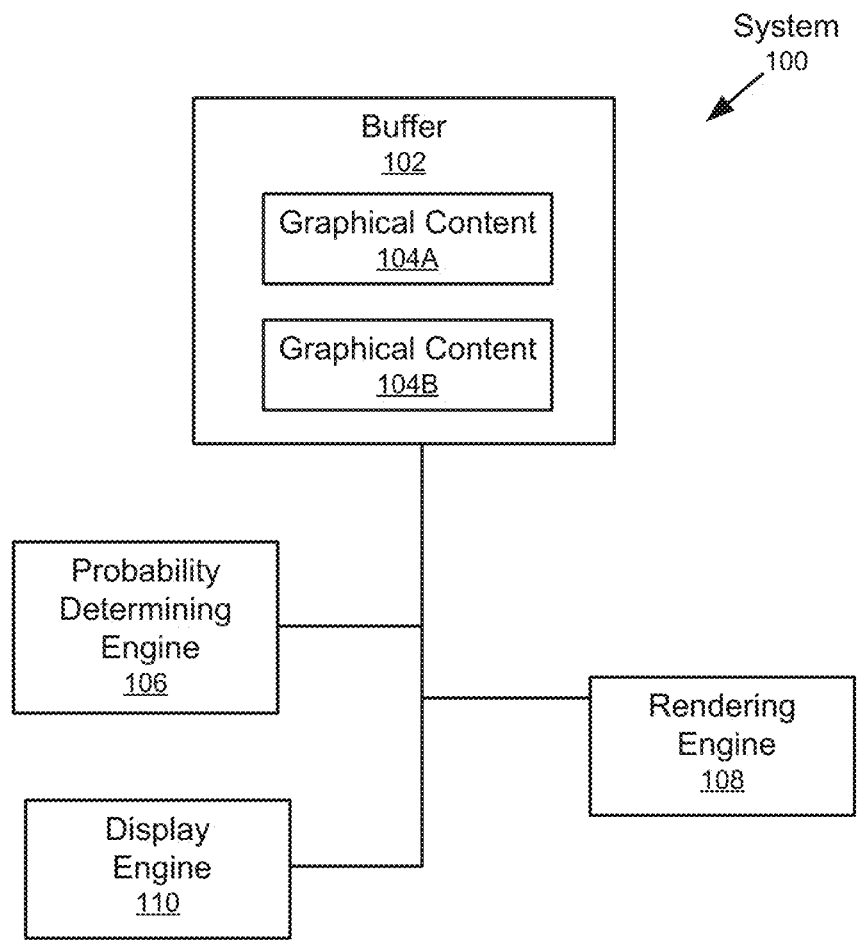
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third) may be used as an adjective for an element (i.e., any noun in the application). The use of ordinal numbers is not to imply or create a particular ordering of the elements nor to limit any element to being only a single element unless expressly disclosed, such as by the use of the terms "before," "after," "single," and other such terminology. Rather the use of ordinal numbers is to distinguish between the elements. By way of an example, a first element is distinct from a second element, and the first element may encompass more than one element and may succeed (or precede) the second element in an ordering of elements.

In general, embodiments of the invention provide a method, a non-transitory computer readable medium (CRM), and a system for processing images in an information sharing and collaboration environment. More specifically, embodiments of the invention are directed to processing and displaying images based on an order in which the images were created. A probability that a first graphical content was created before a second graphical content may be determined, and an opacity of an overlapped portion of the graphical contents may be rendered using this probability. As a result, the rendered overlapped portion may visually indicate the uncertainty in an order in which these graphical contents were created.

FIG. 1 shows a system (100) in accordance with one or more embodiments of the invention. As shown in FIG. 1, the system (100) has multiple components, and may include, for example, a buffer (102), graphical contents (104A and 104B), a probability determining engine (106), a rendering engine (108), and a display engine (110). Each of these components (102, 106, 108 and 110) may be located on the same computing device (e.g., a personal computer (PC), laptop, tablet PC, smartphone, multifunction peripheral, kiosk, server, PIC device) or on different computing devices connected by a network of any size having wired and/or wireless segments. Each of these components is discussed in further detail below.

The system (100) includes the buffer (102). The buffer (102) may be implemented in hardware (i.e., circuitry), software (e.g., executed in CPU, GPU, FPGA), or any combination thereof. The buffer (102) may be configured to store graphical contents (104A and 104B) created and transmitted by participants of an interactive meeting over a network on computing devices different from that of the system (100). The graphical contents (104A and 104B) may be saved in the buffer (102) in any imaging format (e.g., a JPEG image, a GIF image, a bitmap image, a TIFF image, a PDF document).

The system (100) further includes the probability determining engine (106). The probability determining engine (106) may be implemented in hardware (i.e., circuitry), software (e.g., executed in CPU, GPU, FPGA), or any combination thereof. The probability determining engine (106) may collect and compile data representing a network transfer time probability distribution of messages sent from a first participant (i.e., a first source) and a second participant (i.e., a second source) of the interactive meeting to a target destination (i.e., the system (100)) into a histogram. The histogram may be used as an approximation of a probability density function to calculate the probability that the graphical content (104A) was created prior to the graphical content (104B).

For example, in one or more embodiments where the system (100) is the target destination, the system (100) may be a central server that organizes and routes information transmitted from the different sources. Alternatively, the histogram may only include data representing a network transfer time probability distribution of the messages sent from the first source and the second source to the system 100. In this example, the system 100 is a target destination for the messages from the first and second sources. In yet another example, the histogram may also include transfer times of messages sent from the second source to the first source. In other words, the first source is now a target destination instead of the system 100.

Furthermore, the probability determining engine (106) may use the probability density function to determine a probability that graphical content (104A) was created prior to graphical content (104B), and outputs the determined probability to the rendering engine (108). The determined probability may be used to ascertain that graphical content (104A) was likely created before graphical content (104B). In one or more embodiments, the determined probability may also be stored in the buffer (102).

The system (100) further includes the rendering engine (108). The rendering engine (108) may be implemented in hardware (i.e., circuitry), software (e.g., executed in CPU, GPU, FPGA), or any combination thereof. The rendering engine (108) renders the graphical contents (104A and 104B) such that a portion of each graphical content (104A and 104B) is overlapped, and outputs the rendered graphical contents (104A and 104B) to the display engine (110).

Furthermore, the rendering engine (108) uses the probability output from the probability determining engine (106) as an opacity value in blending an overlapped portion of the first graphical content and the second graphical content. Upon determining the opacity, the rendering engine (108) may obtain a color of the overlapped portion using a transparency blending formula, and start a rendering process of the graphical contents (104A and 104B) using the obtained color. The rendering process may be performed by, for example, geometrically projecting the graphical contents (104A and 104B) onto a scene of an image plane to rasterize the overlapped portion of the graphical contents (104A and 104B).

The system (100) may further include the display engine (110). The display engine (110) may be implemented in hardware (i.e., circuitry), software (e.g., executed in CPU, GPU, FPGA), or any combination thereof. The display engine (110) generates (i.e., displays), after receiving the rendered graphical contents from the rendering engine (108), the rendered graphical contents using one or more lights, effects, and/or images.

Furthermore, the display engine (110) may include a 2-dimensional and/or 3-dimensional projector (e.g., a projector (LED, LCD, DLP, laser-based, etc.), a combination of one or more projectors) that is able to project a digital image onto a workspace (e.g., a table surface, a wall, a projector screen, etc.). In one or more embodiments, the display engine (110) may also include a screen of a computing device (e.g., a computer monitor, a laptop screen, etc.).

Although the system (100) is shown as having four components (102, 106, 108, and 110), in other embodiments of the invention, the system (100) may have more or fewer components. Furthermore, the functionality of each component described above may be shared among multiple components or performed by other components entirely. In addition, each component (102, 106, 108, and 110), may be utilized multiple times in serial or parallel to carry out an iterative operation.

By utilizing the above described engines, the system (100) may visually demonstrate any existing uncertainty regarding the proper ordering of the graphical contents (104A and 104B) based on the creation order of the graphical contents (104A and 104B).

Figure 2:
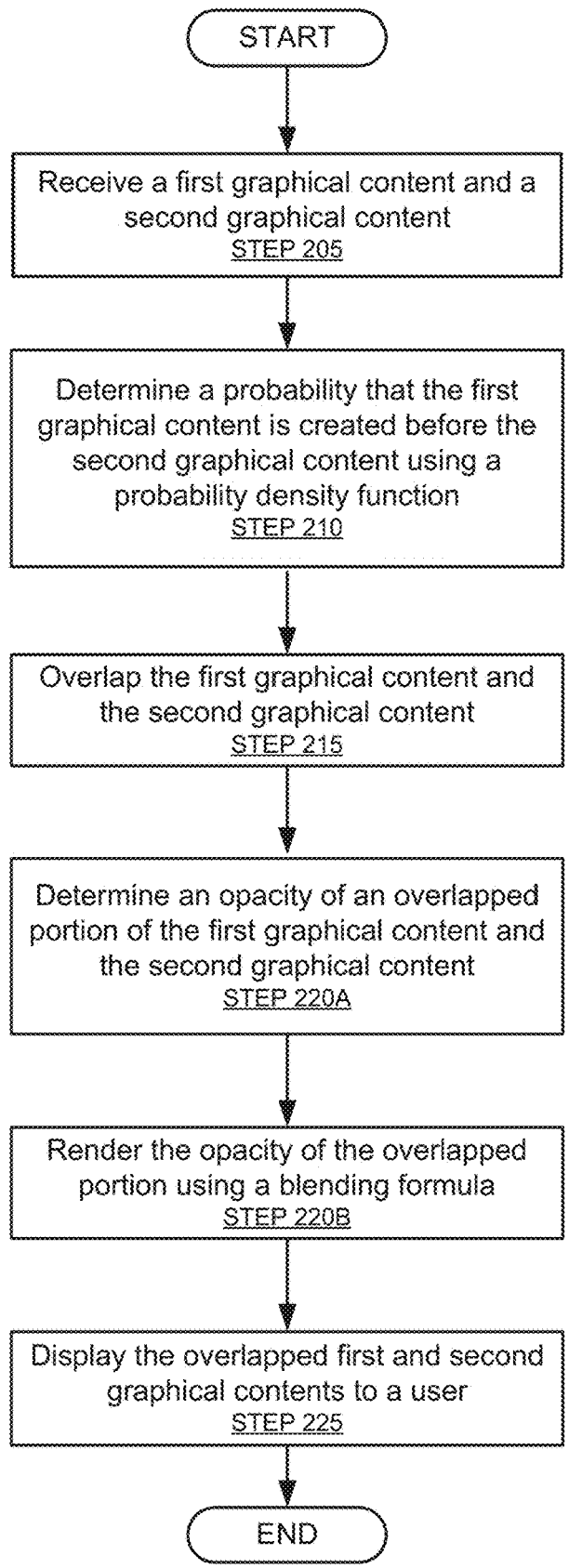
FIG. 2 shows a flowchart of an image processing method in accordance with one or more embodiments of the invention.

FIG. 2 shows a flowchart of an image processing method in accordance with one or more embodiments of the invention. One or more of the individual processes in FIG. 2 may be performed by the system (100) of FIG. 1, as described above. One or more of the individual processes shown in FIG. 2 may be omitted, repeated, and/or performed in a different order than the order shown in FIG. 2. Accordingly, the scope of the invention should not be limited by the specific arrangement as depicted in FIG. 2.

At S205, the buffer (102) may receive a first graphical content from a first source and a second graphical content from a second source. The second source may be different from the first source within an information sharing and collaboration environment (i.e., an interactive meeting).

In one or more embodiments, the first source may be a local source and the second source may be a remote source. Alternatively, the first and second sources may both be remote sources. For example, the buffer (102) may be a buffer of a central server that organizes and routes information transmitted from the different sources.

At S210, as discussed in reference to FIG. 1, a probability that the first graphical content was created before the second graphical content is determined using a histogram. In one or more embodiments, using the histogram, the probability that the first graphical content was created before the second graphical content is determined by calculating a probability that the first graphical content was sent to the second source before the second graphical content was created.

For example, the probability that the first graphical content was sent to the second source before the second graphical content was created is determined based on a probability distribution calculated using the transfer times of the messages sent from the first source to the second source. As another example, the probability that the first graphical content was sent to the central sever before the second graphical content, which may indicate that the first graphical content was created first, is determined based on a probability distribution calculated using the transfer times of messages sent from the first and second sources to the central sever.

In one or more embodiments, determinations of the probability may occur at the first source, the second source, or at the central server if one is being used to mediate message transmission. In one or more embodiments, the server may adjoin information to each message so that each participating user's site may determine the expected ordering and associated probabilities (and by extension blending opacities) of graphical contents.

According to one or more embodiments where the first source is a local source, in determining the probability in S210, remote content is incorporated into a local rendering. For example, suppose user A creates content a at time t=0, and receives a message b from user B at time $t_b>0$. The probability that b should appear above a in the rendering may be calculated. In other words, the probability that the network transfer time was less than $t_b$, and therefore b was sent after a was created may be calculated.

This calculation may require statistics about the network transfer time probability distribution. Assuming clocks for A and B may be synchronized for data gathering, one way to generate the distribution may be to send a large number of representative messages from B to A, measuring transfer times and compiling them into the histogram (as an approximation of a probability density function $f_{BA}$) as discussed above.

For example, a probability distribution $g_{BA}$ may be calculated by integrating the probability density function $f_{BA}$ using the below formula:

$$g_{BA}(x)=\int_0^x f_{BA}(s)ds.$$

Specifically, the probability that the network transfer time is less than $t_b$ (in other words, b was sent after a was created) may be determined as $g_{BA}(t_b)$. As such, network transfer times may be advantageously used to approximate an order in which the graphical contents were created.

At S215, as discussed above in reference to FIG. 1, a portion of the first graphical content is overlapped with a portion of the second graphical content creating an overlapped portion of the first and second graphical contents.

At S220A, as discussed above in reference to FIG. 1, an opacity of each of the overlapped portions of the first and second graphical contents is determined based on the probability determined in S210. For example, the opacity of the overlapped portion of the second graphical content is the probability that the first graphical content was created before the second graphical content.

At S220B, as discussed above in reference to FIG. 1, the overlapped portion of the first and second graphical contents may be rendered using a standard transparency formula. In one or more embodiments, the standard transparency formula may be: $(1-\alpha)A+\alpha B$, where $\alpha$ is the opacity of the second graphical content, A is the color of the first graphical content, and B is the color of the second graphical content.

Alternatively, the rendering may be accomplished using other methods in addition to the above canonical formula. For example, image masking may also be used to blend transparent colors. In yet another embodiment, digital compositing that applies non-linear approach may also be used as an alternative to the above formula, especially in a logarithmic color space.

In the above example of one or more embodiments, only two graphical contents are presented and overlapped. In this example, the blending may be commutative. Specifically, there are two possible orderings: A before B, or B before A. These two orderings have associated probabilities, which must sum to 1.

In another example of one or more embodiments, three or more graphical contents may be presented and overlapped. For three objects, there are six possible orderings, each with an associated probability. These probabilities must sum to 1, and thus there are five parameters involved. In this case, the arithmetic is more complicated and the blending may not be commutative.

At S230, as discussed above in reference to FIG. 1, the rendered graphical contents are projected onto a screen (e.g., on the PIC surface). The opacities in the overlapped portion of the first and second graphical contents visually expresses an uncertainty in the creation order of the graphical contents.

Figure 3:
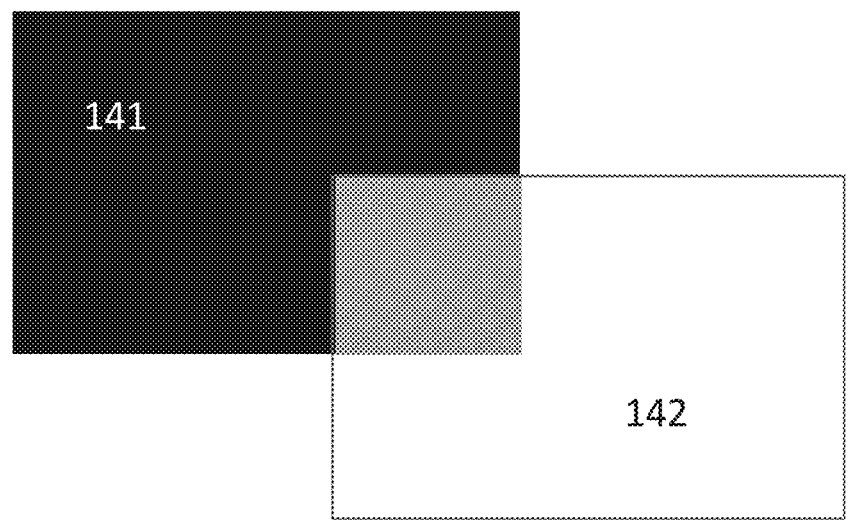
FIG. 3 shows an implementation example in accordance with one or more embodiments of the invention.

FIG. 3 shows an implementation example of a rendered graphical content in accordance with one or more embodiments of the invention. As shown in FIG. 3, a first graphical content received from a first source is shown as a black rectangle 141 and a second graphical content received from a second source is shown as a white rectangle 142.

In example shown in FIG. 3, assume based on transfer time statistics gathered from the network that there is a 60% probability that the white rectangle 142 was received at the rendering site (i.e., the target destination) after the black rectangle 141. The standard transparency formula is applied to produce a blend of 40% black and 60% white. This blend is shown in the grey intersection (i.e., the overlapped portion) of the white rectangle 142 and the black rectangle 141, which visually expresses an approximation that the black rectangle 141 was created before the white rectangle 142.

Figure 4:
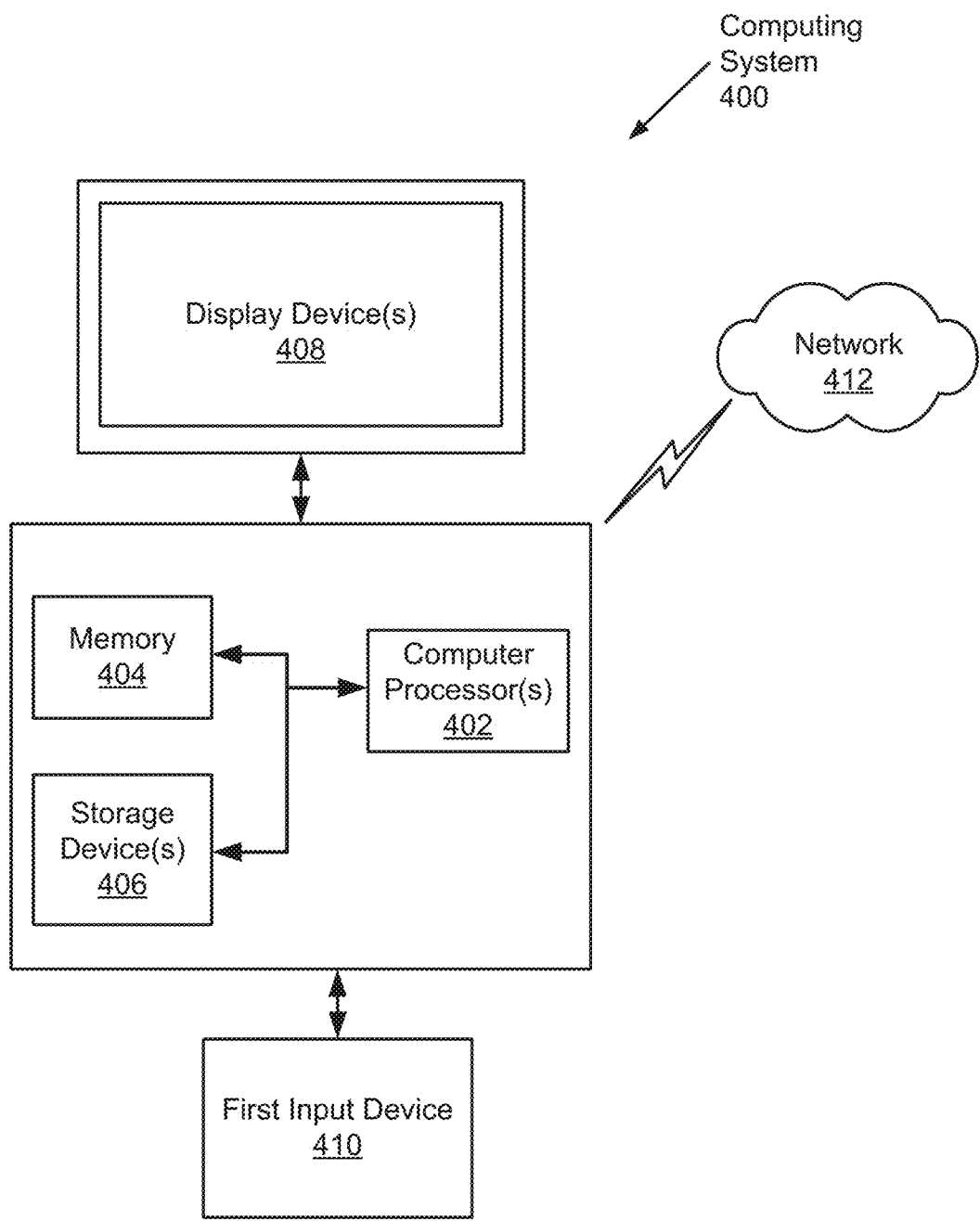
FIG. 4 shows a computing system in accordance with one or more embodiments of the invention.

FIG. 4 shows a computing system in accordance with one or more embodiments of the invention. Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform embodiments of the invention.

Further, one or more elements of the aforementioned computing system (400) may be located at a remote location and be connected to the other elements over a network (412). Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

One or more embodiments of the invention provide the following improvements in electronic collaboration technologies: the ability to visually express uncertainty in an ordering of the graphical contents based on the order in which the graphical contents were created instead of the order in which the graphical contents were received; the ability to approximate an ordering of creation of the graphical contents using network transfer times; etc.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing images in an information sharing and collaboration environment, the method comprising:
    receiving a plurality of graphical contents including a first graphical content from a first source and a second graphical content from a second source different from the first source within the information sharing and collaboration environment and overlapping the first and second graphical contents;
    determining a probability that the first graphical content was created before the second graphical content;
    rendering, using a transparency blending formula based on the probability that the first graphical content was created before the second graphical content, an opacity of an overlapped portion of the first and second graphical contents; and
    displaying, on a display, the overlapped first and second graphical contents, wherein
    the probability that the first graphical content was created before the second graphical content is calculated using a probability density function, and
    the probability density function is based on transfer times of messages from the first source and the second source recorded over a predetermined period of time.

2. The method of claim 1, wherein an opacity value of the first graphical content in the overlapped portion is the probability that the first graphical content was created before the second graphical content.

3. The method of claim 2, wherein an opacity value of the second graphical content in the overlapped portion is a complement of the probability that the first graphical content was created before the second graphical content.

4. The method of claim 1, wherein the probability density function is a histogram including transfer times of the messages from the first source and the second source recorded over a predetermined period of time.

5. The method of claim 4, wherein the histogram includes data representing a network transfer time probability distribution of the messages sent from the first source and the second source to a target destination.

6. The method of claim 4, wherein
    the first source is a local source and the second source is a remote source, and
    the first and second graphical contents are both received at the first source.

7. The method of claim 6, wherein
    the histogram includes only the transfer times of messages sent from the second source to the first source,
    the probability that the second graphical content was created before the first graphical content is determined by calculating a probability that the second graphical content was sent to the first source before the first graphical content was created, and
    the probability that the second graphical content was sent to the first source before the first graphical content was created is determined based on a probability distribution calculated using the transfer times of the messages sent from the second source to the first source.

8. The method of claim 1, wherein the probability that the first graphical content was created before the second graphical content may be determined at the first source, the second source, or at a central server.

9. The method of claim 1, wherein the plurality of graphical contents may comprise three or more graphical contents.

10. A non-transitory computer readable medium (CRM) storing computer readable program code for displaying an ordering of a plurality of graphical contents embodied therein, the computer readable program code causes a computer to:
    receive a plurality of graphical contents including a first graphical content from a first source and a second graphical content from a second source different from the first source within an information sharing and collaboration environment and overlap the first and second graphical contents;
    determine a probability that the first graphical content was created before the second graphical content;
    render, using a transparency blending formula based on the probability that the first graphical content was created before the second graphical content, an opacity of an overlapped portion of the first and second graphical contents; and display, on a display, the overlapped first and second graphical contents, wherein the probability that the first graphical content was created before the second graphical content is calculated using a probability density function, and the probability density function is based on transfer times of messages from the first source and the second source recorded over a predetermined period of time.

11. The CRM of claim 10, wherein an opacity value of the first graphical content in the overlapped portion is the probability that the first graphical content was created before the second graphical content.

12. The CRM of claim 11, wherein the opacity value of the second graphical content in the overlapped portion is a complement of the probability that the second graphical content was created before the first graphical content.

13. The CRM of claim 10, wherein the probability density function is a histogram including the transfer times of messages from the first source and the second source recorded over a predetermined period of time.

14. A system for displaying an ordering of a plurality of graphical contents in an information sharing and collaboration environment, the system comprising:
a memory; and
a processor coupled to the memory and that:
receives a plurality of graphical contents including a first graphical content from a first source and a second graphical content from a second source different from the first source within the information sharing and collaboration environment and overlaps the first and second graphical contents;
determines a probability that the first graphical content was created before the second graphical content;
renders, using a transparency blending formula based on the probability that the first graphical content was created before the second graphical content, an opacity of an overlapped portion of the first and second graphical contents; and
displays, on a display, the overlapped first and second graphical contents, wherein the probability that the first graphical content was created before the second graphical content is calculated using a probability density function, and the probability density function is based on transfer times of messages from the first source and the second source recorded over a predetermined period of time.

15. The system of claim 14, wherein an opacity value of the first graphical content in the overlapped portion is the probability that the first graphical content was created before the second graphical content.

16. The system of claim 15, wherein the opacity value of the second graphical content in the overlapped portion is a complement of the probability that the second graphical content was created before the first graphical content.

17. The system of claim 14, wherein the probability density function is a histogram including the transfer times of messages from the first source and the second source recorded over a predetermined period of time.

* * * * *